United States Patent
Yonemoto et al.

(10) Patent No.: US 8,275,046 B2
(45) Date of Patent: Sep. 25, 2012

(54) FAST MACROBLOCK STRUCTURE DECISION USING SAD DISCREPANCY AND ITS PREDICTION MODE

(75) Inventors: Akihiro Yonemoto, Tokyo (JP); Masato Shima, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1041 days.

(21) Appl. No.: 12/233,931

(22) Filed: Sep. 19, 2008

(65) Prior Publication Data
US 2010/0074339 A1 Mar. 25, 2010

(51) Int. Cl.
*H04N 7/12* (2006.01)

(52) U.S. Cl. ......... 375/240.24; 375/240.01; 375/240.25; 375/240.26

(58) Field of Classification Search ............. 375/240.24, 375/240.01, 240.25, 240.26
See application file for complete search history.

(56) References Cited

U.S. PATENT DOCUMENTS

| | | | | |
|---|---|---|---|---|
| 5,485,279 A | * | 1/1996 | Yonemitsu et al. | 375/240.14 |
| 5,751,378 A | * | 5/1998 | Chen et al. | 348/700 |
| 5,818,968 A | * | 10/1998 | Yoshimoto | 382/236 |
| 6,449,312 B1 | * | 9/2002 | Zhang et al. | 375/240.16 |
| 7,016,407 B2 | * | 3/2006 | Kaye et al. | 375/240.01 |
| 7,164,717 B2 | * | 1/2007 | Katsavounidis et al. | 375/240.12 |
| 7,170,934 B2 | * | 1/2007 | Linzer | 375/240 |
| 2002/0186768 A1 | * | 12/2002 | Dimitrova et al. | 375/240.12 |
| 2005/0249284 A1 | * | 11/2005 | Lee et al. | 375/240.16 |
| 2008/0007613 A1 | * | 1/2008 | Linzer et al. | 348/14.01 |
| 2008/0101473 A1 | * | 5/2008 | Tanaka et al. | 375/240.16 |

OTHER PUBLICATIONS

Wiegand et al "Overview of the H.264/AVC Video Coding Standard", Jul. 2003.*
Sullivan et al, "The H.264/AVC Advanced Video Coding Standard: Overview and Introduction to the Fidelity Range Extensions", Aug. 2004.*
Zheng et al, "An Efficient FGS coding scheme for interlaced scalable video coding", 2006.*

* cited by examiner

*Primary Examiner* — Taghi Arani
*Assistant Examiner* — Shan Elahi
(74) *Attorney, Agent, or Firm* — Robert D. Marshall, Jr.; Wade James Brady, III; Frederick J. Telecky, Jr.

(57) ABSTRACT

The present invention is a method to accelerate the frame/field decision by estimating more suitable structure using SAD (sum of absolute difference) between picture samples and their mean. Next the uses the correlation observed between the optimal macroblock prediction modes found with the inferred structure and the probability of the non-inferred structure being better than the inferred one. The invention can lead to the significant reduction of the computational complexity at the cost of slight degradation of coding efficiency.

6 Claims, 5 Drawing Sheets

FAST MACROBLOCK STRUCTURE DECISION USING SAD DISCREPANCY AND ITS PREDICTION MODE

TECHNICAL FIELD OF THE INVENTION

The technical field of this invention is the field of frame/field structure decision far video compression. The H.264/MPEG-4 AVC specification allows the frame/field structure to be altered on a macroblock pair basis as well as on a frame basis. The invention is designed to accelerate the decision for the macroblock pairs, but it can apply to other video coding standards to better estimate the structure.

BACKGROUND OF THE INVENTION

The video coding standard H.264/MPEG-4 AVC is intended to achieve much higher coding efficiency than previous video coding standards at the expense of increased encoding complexity. Macroblock adaptive frame/field (MBAFF) is one of the distinguishing features of this standard. MBAFF provides a choice of either frame or field structures on a macroblock pair basis. MBAFF improves coding efficiency especially for interlaced video sequences. However, a straightforward implementation of MBAFF that selects the better structure after finding the optimal macroblock prediction modes with both structures doubles the encoding computational complexity. The present invention accelerates the decision. First, this invention estimates more suitable structure using sum of absolute difference (SAD) between picture samples and their mean. Second, this invention uses the correlation observed between the optimal macroblock prediction modes found with the inferred structure and the probability of the non-inferred structure being actually better than the inferred one. The present invention can significantly reduce the computational complexity at the cost of slight degradation of coding efficiency.

The H.264/MPEG-4 AVC standard includes support for both interlaced and progressive video sequences. The interlaced video sequences include fields that are sampled with half vertical resolution. Temporally consecutive fields are vertically interleaved line by line (i.e. horizontal-line by horizontal-line) to form a frame. To support interlaced video sequences, the standard provides a choice of frame or field structures on a frame-to-frame basis. Encoding progressive video sequences with the frame structure and interlaced video sequences with the field structure generally maximizes coding efficiency. Recent video coding standards commonly divide pictures into square macroblocks (MBs) of 16×16 pixels and code with the macroblocks.

Figure 1:
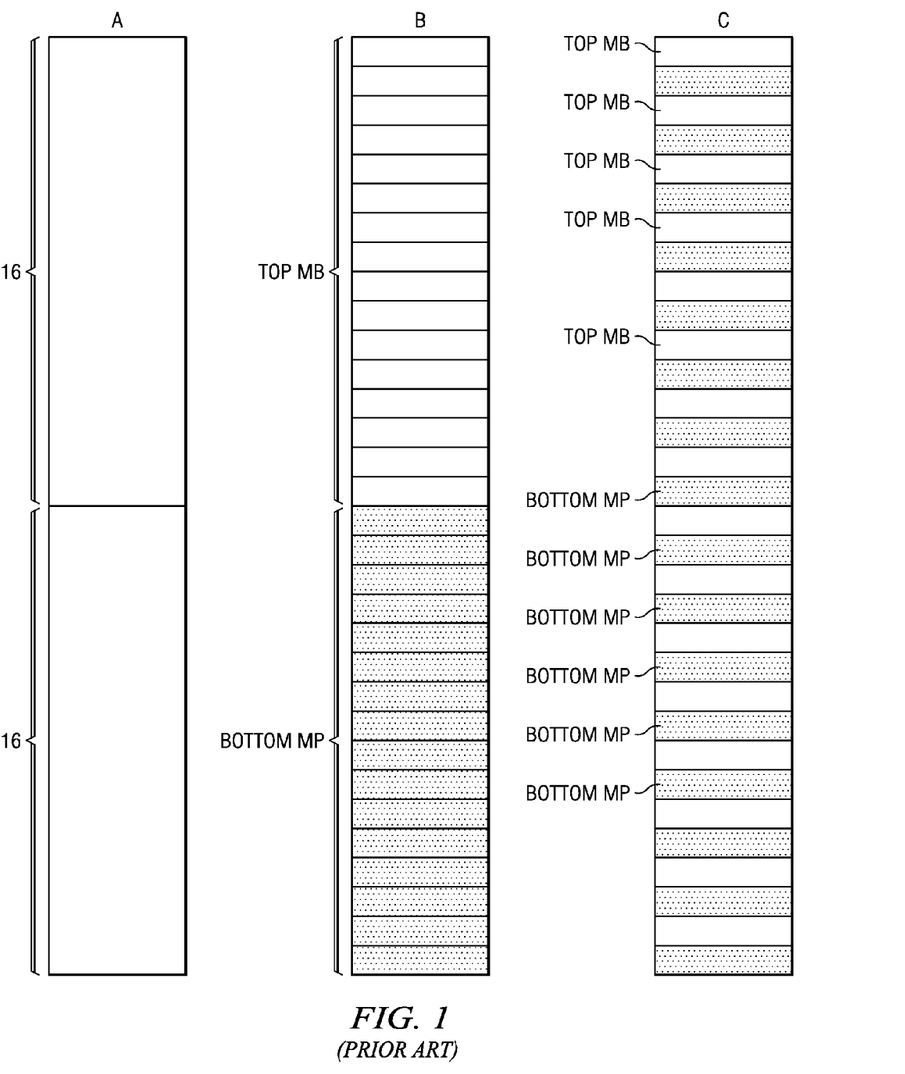
FIG. 1 illustrates a macroblock pair and their frame/field, structure (Prior Art)

The H.264/MPEG-4 AVC standard allows the choice of field/frame structure at the macroblock level as well as at the frame level. This is called macroblock adaptive frame/field (MBAFF). When MBAFF is enabled, vertically neighboring macroblocks form a macroblock pair as illustrated in FIG. 1A. The top and the bottom macroblocks are illustrated for frame structure in FIG. 1B and for field structure in FIG. 1C. The use of MBAFF leads to an improvement in coding efficiency even though the determined structures of some macroblock pairs are different from that of the video sequence.

The H.264/MPEG-4 AVC standard is intended to achieve higher coding efficiency than previous video coding standards through an extensive variety of intra/inter prediction modes with other coding tools. Table 1 lists a brief classification and explanation of the prediction modes.

TABLE 1

Prediction Modes in H.264/MPEG-4 AVC

| Prediction Mode | Description |
| --- | --- |
| B-Direct | Inter prediction applied; no motion information coded |
| Inter_16x16 | Inter prediction applied for whole macroblock |
| Inter_16x8 | Macroblock partitioned into two 16 × 8 blocks; then inter prediction applied respectively |
| Inter_8x16 | Macroblock partitioned into two 8 × 16 blocks; then inter prediction applied respectively |
| Inter_8x8 | Macroblock partitioned into four 8 × 8 sub-macroblocks; macroblocks sub-divided further into 8 × 4, 4 × 8, 4 × 4 or remains 8 × 8; then inter prediction applied respectively |
| B/P_Skip | Inter prediction applied; neither motion information nor residual data is coded |
| Intra_16x16 | Inter prediction for whole 16 × 16 macroblock |
| Intra_4x4 | Macroblock partitioned into sixteen 4 × 4 sub-macroblocks; then inter prediction applied respectively |
| I_PCM | Macroblock sample is coded without any transformation compression |

The encoding process must find the optimal prediction mode among the large varieties for best encoding efficiency. Inter-prediction includes the process of finding the optimal macroblock/sub-macroblock partitioning and finding the optimal motion vector for each block. It is a computationally expensive task to find the optimal prediction mode for a macroblock. In most cases when the encoder runs on a PC more than 90% of total encoding time is consumed by this task. During encoding all possible prediction modes for a macroblock are tested and the best one is chosen base on a cost measure. The cost function generally has the form:

$$COST = D + \lambda * R \quad (1)$$

where: D is the distortion between the pixels of the macroblock to be coded and its prediction, which is usually measured in SAE (sum of absolute error) or SSE (sum of square error); R is the bit-length required to convey the prediction information such as prediction mode and motion vectors; and λ is a tradeoff parameter between the distortion and the bit length. Encoding a macroblock determines the optimal prediction mode and the associated minimal COST.

Figure 2:
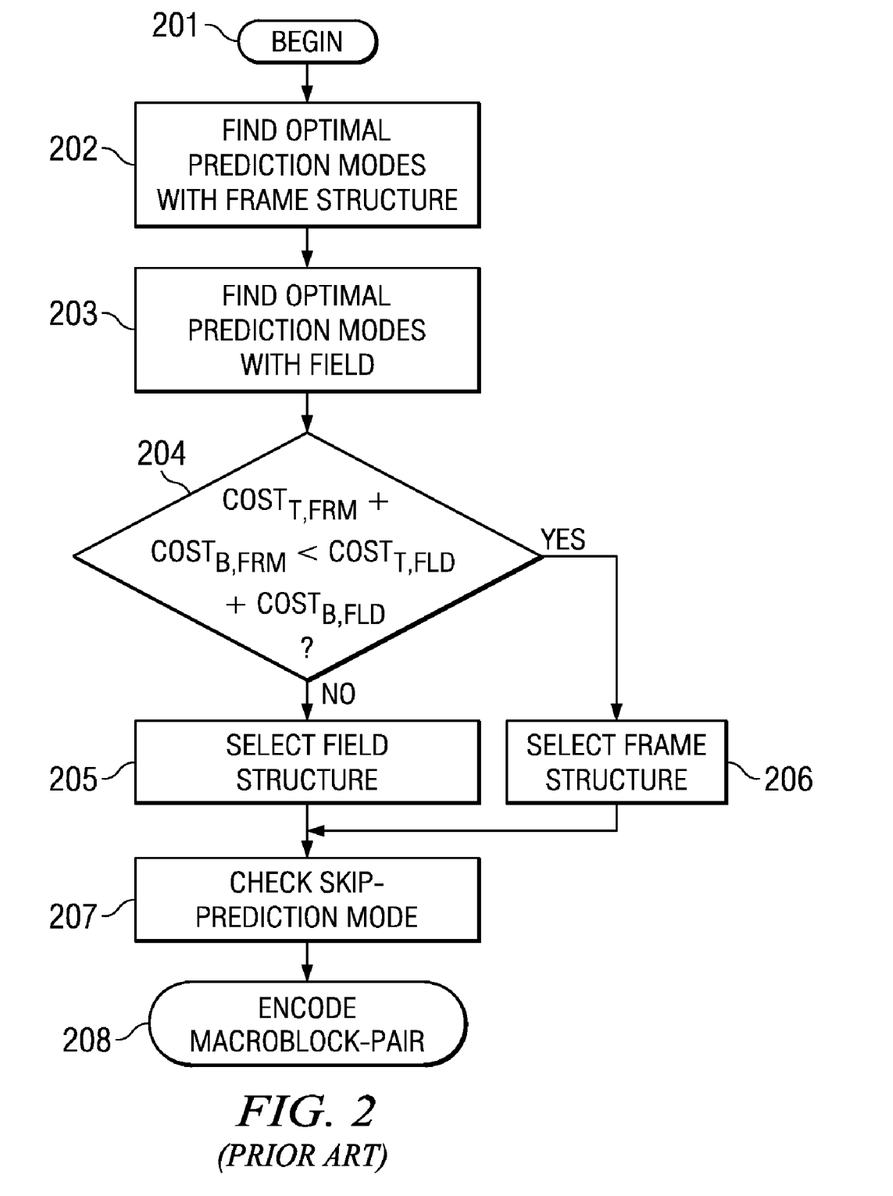
FIG. 2 illustrates the flowchart of an exhaustive process making a frame/field structure decision for a macroblock pair.

FIG. 2 illustrates a flowchart of a straight forward and exhaustive way to determine the frame/field structure of a macroblock pair. The method begins at begin block 201. The method searches for the optimal prediction modes of the top and the bottom macroblocks with the frame structure in block 202 and with the field structure in block 203. Decision block 204 calculates a cost function. In block 204: $COST_{T,FRM}$ is the COST function for the top macroblock with frame structure; $COST_{B,FRM}$ represent the COST function the bottom macroblock with the frame structure; $COST_{T,FLD}$ is the COST function for the top macroblock with field structure; and $COST_{B,FLD}$ is the COST function the bottom macroblock with the field structure. The method then selects the better structure based on the COST query 204. The field structure is selected in block 205 and the frame structure is selected in block 206. A post process block 207 checks the skip prediction mode as described below. Block 208 encodes the macroblock pair based on the frame/field decision made as a result of query 204. This exhaustive method must find the optimal prediction mode twice for the top and the bottom macroblocks with each of the frame and the field structures. The worse one of the two results is discarded regardless of its computational cost. Hence, a method to make an early decision of the structure with only a slight degradation of coding efficiency is desirable.

SUMMARY OF THE INVENTION

The present invention is a method to accelerate the decision of frame/field structure of a macroblock pair. The decision is made in two stages. In the first stage, a frame/field SAD discrepancy of the current macroblock pair is computed as an estimation of the frame/field COST discrepancy. In the second stage, an early decision is made based on a statistical tendency. Once the decision is made, the determined structure and the optimal prediction modes are examined for compliance of the sequence.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
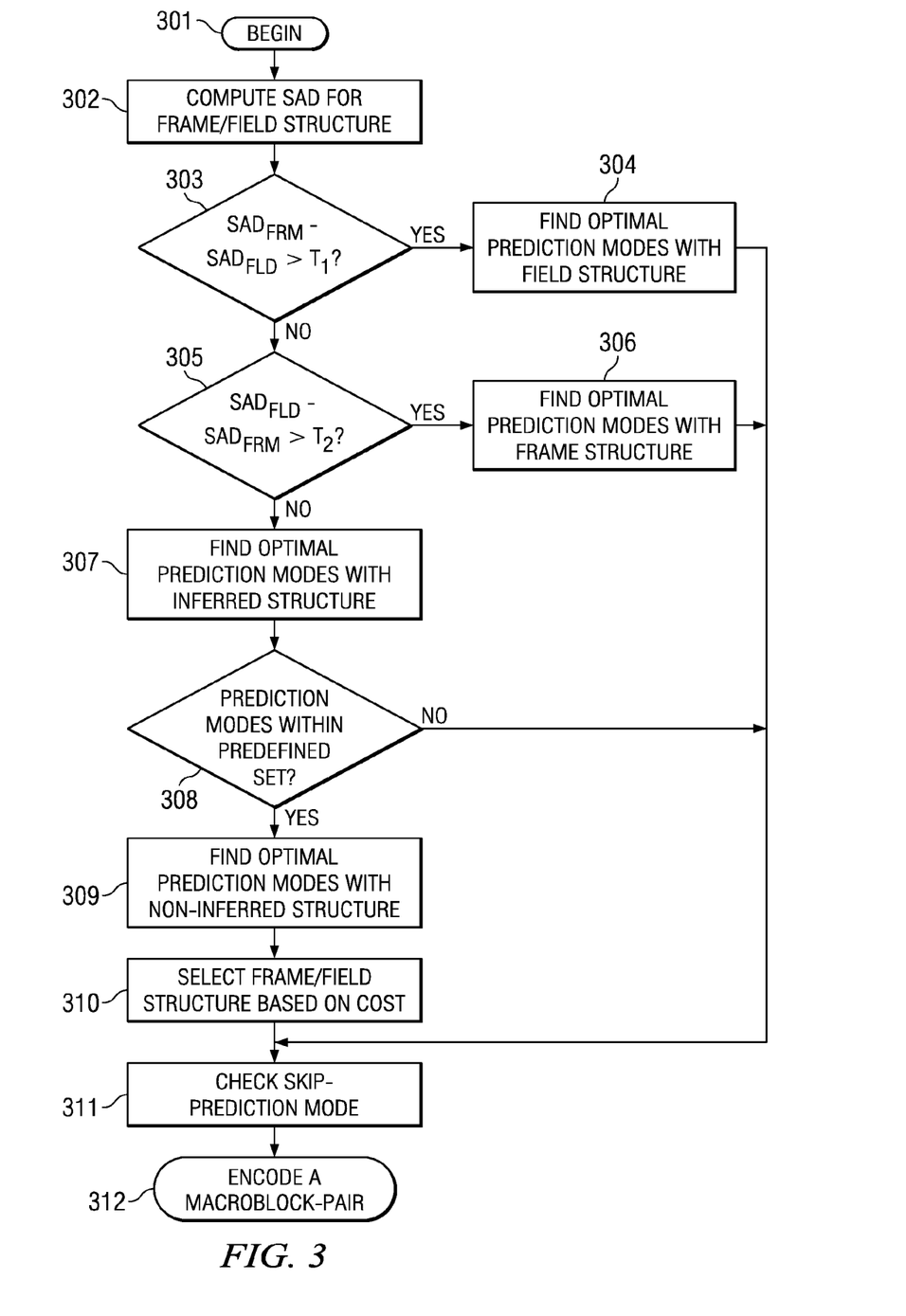
FIG. 3 illustrates a flowchart of the encoding of a macroblock pair according to the present invention.

The present invention is a method to speed the decision of frame/field structure of a macroblock pair. FIG. 3 illustrates that this decision is made in two stages. The frame/field SAD is defined as sum of absolute differences between sample values and their mean as described below.

The method illustrated in FIG. 3 begins with begin block 301. The first block 302 computes frame/field SAD discrepancy of the current macroblock pair as an estimation of frame/field COST discrepancy. Decision block 303 determines if the frame/field SAD discrepancy is greater than a first threshold $T_1$ ($SAD_{FRM} - SAD_{FLD} > T_1$). In order to improve the estimation of the COST discrepancy with that of SAD, the vertical difference is enhanced by dividing macroblock pairs into vertically long sub-blocks prior to the SAD computation. The chrominance components as well as the luminance component are taken into account for the SAD.

If so (Yes at decision block 303), then an early decision of the field structure is made without testing any other prediction modes for the macroblock pair. Block 304 determines this optimum field structure mode.

If the SAD discrepancy does not cross the predefined threshold $T_1$ (No at decision block 303), then decision block 305 determines if the reverse frame/field SAD discrepancy is greater than a second threshold $T_2$ ($SAD_{FLD} - SAD_{FRM} > T_2$). Following the second test block 305, an early decision is made based on a statistical tendency. If the field/frame SAD discrepancy is greater than the second threshold $T_2$ (Yes at decision block 305), the process proceeds to block 306. Block 306 finds the optimal prediction modes with frame structure.

A statistical study shows correlation between the optimal prediction modes found with the inferred structure and the probability of the non-inferred structure is better than the inferred structure. If the field/frame SAD discrepancy is less than the second threshold $T_2$ (No at decision block 305), the process enters the second stage. The H.264/MPEG-4 AVC standard specifies inference of more probable structure for the current macroblock pair based on the flame/field structure of neighboring macroblock pairs that are already coded. The process determines a set of prediction modes with higher probability of finding lower COST with the non-inferred structure empirically derived in advance. Block 307 first finds the optimal prediction modes for the current macroblock pair with the inferred structure. Decision block 308 determines if the optimal prediction modes of the top and the bottom macroblocks are within the predefined set. If not within the predefined set (No at decision block 308), the decision will be made without testing the non-inferred structure by processing to skip-prediction mode check in block 311. If within the predefined set (Yes at decision block 308), then block 309 finds the optimal prediction modes with non-inferred structure. Block 310 selects the frame/field structure based on COST.

Following processing in block 304, 306 or 310 or a NO decision in decision block 308, block 311 examines the determined structure and the optimal prediction modes for compliance of the sequence. Block 312 encodes the macroblock pair based upon this determination.

Figure 4:
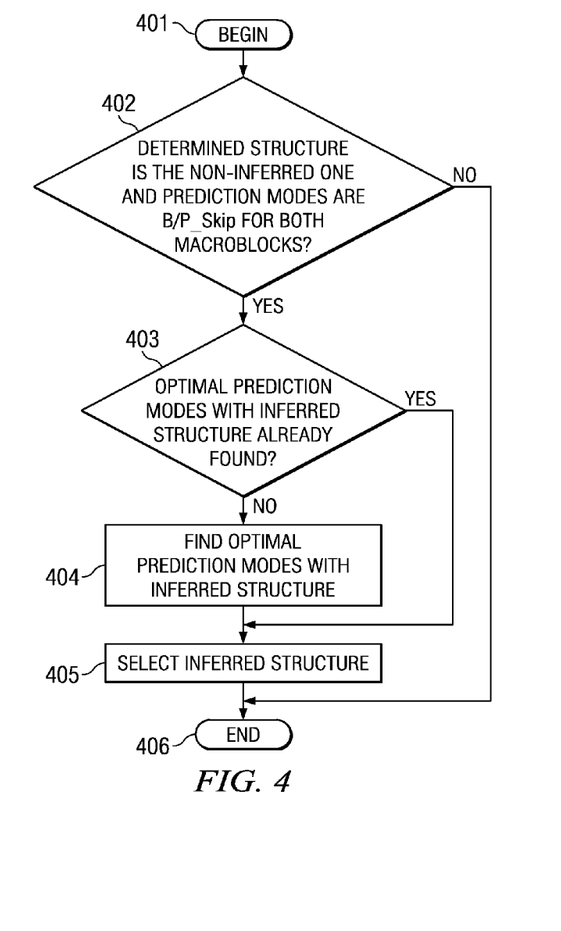
FIG. 4 illustrates a flowchart of a post process to assure compliance.

FIG. 4 illustrates the flowchart of the post process of blocks 207 and 311. The post process begins with begin block 401. Decision block 402 determines whether the selected structure is the non-inferred one. If this is not the case (No in decision block 402), then the process completes with end block 406. If this is the case (Yes in decision block 402), then decision block 403 determines whether the optimal prediction modes for the top and the bottom macroblocks are both B/P_Skip. If this is not the case (No in decision block 403), then the optimal prediction modes with inferred structure is found in block 404. If this not the case (Yes in decision block 403), then structure reverts to the inferred structure. In either case, block 405 selects the structure. There is no means to change the structure type to the non-inferred one when both of the top and the bottom macroblocks are skipped. Thus no prediction information will be included for them. The process ends with end block 406.

Figure 5:
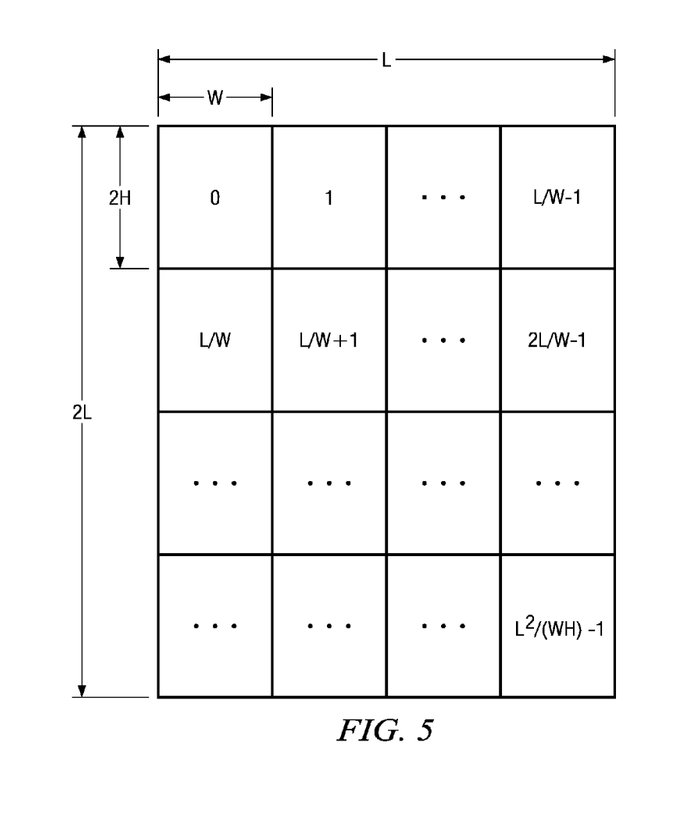
FIG. 5 illustrates the division of a macroblock pair into sub-blocks.
Figure 6:
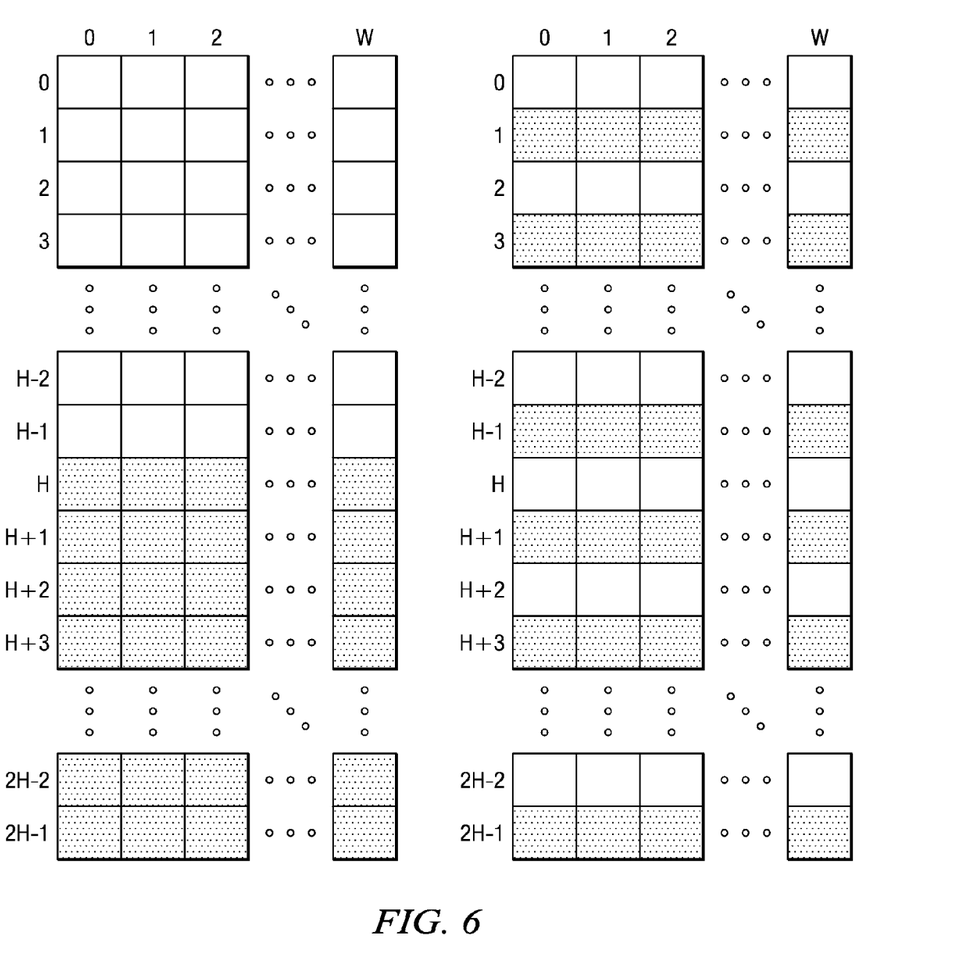
FIG. 6 illustrates the upper pixels and the lower pixels within a sub-block.

In the first stage of this invention, the frame/field SAD discrepancy is computed as an estimate of the COST discrepancy. An early decision will be made if the calculated SAD crosses the predefined threshold $T_1$. To compute the frame/field SAD, the current macroblock pair is first divided into sub-blocks of dimension W×2H as shown in FIG. 5, where: W($\geq$I) and H($\geq$2) are powers of two less than or equal to the macroblock size; L is 16 for the luminance component for H.264/MPEG-4 AVC. The sub-blocks are further divided into two parts, upper pixels and lower pixels, depending on the frame/field structure as illustrated in FIG. 6. Upper pixels are represented with white boxes and lower samples with boxes. For each part of the i-th sub-block (i.e. frame-upper, frame-lower, field-upper, and field-lower) its sample mean is calculated by:

$$\mu_{i,FRM,U} = \frac{1}{W \cdot H} \sum_{y=0}^{H-1} \sum_{x=0}^{W-1} f_i(x, y) \quad (2)$$

$$\mu_{i,FRM,L} = \frac{1}{W \cdot H} \sum_{y=0}^{H-1} \sum_{x=0}^{W-1} f_i(x, y+H) \quad (3)$$

-continued $$\mu_{i,FLD,U} = \frac{1}{W \cdot H} \sum_{y=0}^{H-1} \sum_{x=0}^{W-1} f_i(x, 2y) \quad (4)$$

$$\mu_{i,FLD,L} = \frac{1}{W \cdot H} \sum_{y=0}^{H-1} \sum_{x=0}^{W-1} f_i(x, 2y+1) \quad (5)$$

where: $f_i(x,y)$ denotes sample value at position (x,y) in the i-th sub-block. The frame/field SAD for the sub-block is defined as sum of absolute difference between the sample values and their mean as follows:

$$sad_{i,FRM} = \sum_{y=0}^{H-1} \sum_{x=0}^{W-1} (|f_i(x, y) - \mu_{i,FRM,U}| + |f_i(x, y+H) - \mu_{i,FRM,L}|) \quad (6)$$

$$sad_{i,FLD} = \sum_{y=0}^{H-1} \sum_{x=0}^{W-1} (|f_i(x, 2y) - \mu_{i,FLD,U}| + |f_i(x, 2y+1) - \mu_{i,FLD,L}|) \quad (7)$$

The frame/field SAD of all the sub-blocks are summed as follows:

$$sad_{FRM} = \sum_{i=0}^{L^2/(WH)-1} sad_{i,FRM} \quad (8)$$

$$sad_{FLD} = \sum_{i=0}^{L^2/(WH)-1} sad_{i,FLD} \quad (9)$$

These results yield the frame/field SAD for a color component of the current macroblock pair. The main profile and the baseline profile of H264/MPEG-4 AVC deals with uncompressed video sequences in YUV4:2:0 format. In this format the macroblock size for the chrominance components is half (L=8) of that for the luminance component (L=16). Accordingly, W and H are halved for the chrominance components as follows:

$$W' = \max(\lfloor W/2 \rfloor, 1) \quad (10)$$

$$H' = \max(\lfloor H/2 \rfloor, 1) \quad (11)$$

The frame/field SAD for the current macroblock pair is finally given by incorporating all the color components as follows:

$$SAD_{FRM} = sad_{FRM}(Y) + 4[sad_{FRM}(Cb) + sad_{FRM}(Cr)] \quad (12)$$

$$SAD_{FLD} = sad_{FLD}(Y) + 4[sad_{FLD}(Cb) + sad_{FLD}(Cr)] \quad (13)$$

where: Cb corresponds to the U chrominance component; Cr corresponds to V chrominance component; and the factor of four compensates for the quarter number of samples in the chrominance components.

In order to find the optimum dimension of the sub-blocks, the cross-correlation between the COST discrepancy and the SAD discrepancy with respect to zero was examined as follows. Denoting the discrepancies as:

$$\Delta COST = COST_{FRM} - COST_{FLD} \quad (14)$$

$$\Delta SAD = SAD_{FRM} - SAD_{FLD} \quad (15)$$

The cross-correlation r with respect to zero is defined as:

$$v_{cs} = \sum_{all\ MSPs} \Delta COST \cdot \Delta SAD \quad (16)$$

$$v_{cc} = \sum_{all\ MSPs} \Delta COST^2 \quad (17)$$

$$v_{ss} = \sum_{all\ MSPs} \Delta SAD^2 \quad (18)$$

$$r = \frac{v_{cs}}{\sqrt{v_{cc} \cdot v_{ss}}} \quad (19)$$

where: the summations cover all the macroblock pairs (MBPs) encoded in a sequence.

Table 2 lists the statistics for sub-block dimensions ranging from 1×2 to 16×16 upon encoding the first 30 frames of each video sequence with encoding options.

TABLE 2

| Option | Parameter |
| --- | --- |
| picture type | macroblock adaptive frame field |
| intra frame period | 30 frames |
| number of B pictures | 2 (IBBPBBP . . . ) |
| entropy coding | CABAC |
| direct mode | spatial direct |
| number of reference frames | 1 |
| motion search range | 16 × 16 pixels |
| deblocking filter | used |
| rate control | CBR (constant bit rate) |
| compression rate | 1/30, 1/60, 1/120 |
| bit depth | 8 bits/pixel |
| chrominance format | 4:2:0 |

To see the direct cross-correlation between $\Delta COST$ and $\Delta SAD$, all the frames were encoded as I-pictures (i.e. intra prediction modes) only. Note that $\Delta SAD$ is computed for the original picture samples. Picture samples are directly encoded for I-pictures. Picture samples for P and B pictures may include macroblocks predicted with inter prediction modes in which the prediction error after motion compensation is encoded.

Table 3 shows the cross-correlations for some of those dimensions that presented better figures. The dimension 1×4 gave the best cross-correlation on average. Thus this size was adopted for the implementation of the present invention for YUV4:2:0 format.

TABLE 3

| Progressive (P) | | W × H | | | | | | | |
| --- | --- | --- | --- | --- | --- | --- | --- | --- | --- |
| Interlaced (I) | | 1 × 2 | 1 × 4 | 1 × 8 | 2 × 2 | 2 × 4 | 2 × 8 | 4 × 2 | 4 × 4 | 4 × 8 |
| Sequence | | | | | | | | | | |
| coast_cif | P | 0.653 | 0.659 | 0.686 | 0.633 | 0.646 | 0.681 | 0.597 | 0.615 | 0.668 |
| container_cif | P | 0.709 | 0.704 | 0.684 | 0.661 | 0.671 | 0.659 | 0.610 | 0.624 | 0.629 |
| foreman_cif | P | 0.835 | 0.835 | 0.779 | 0.816 | 0.823 | 0.769 | 0.741 | 0.794 | 0.749 |
| mobile_cif | P | 0.809 | 0.809 | 0.722 | 0.774 | 0.776 | 0.702 | 0.718 | 0.727 | 0.674 |

TABLE 3-continued

| Progressive (P) | | W × H | | | | | | | |
|---|---|---|---|---|---|---|---|---|---|
| Interlaced (I) | | 1 × 2 | 1 × 4 | 1 × 8 | 2 × 2 | 2 × 4 | 2 × 8 | 4 × 2 | 4 × 4 | 4 × 8 |
| mother_cif | P | 0.648 | 0.725 | 0.752 | 0.552 | 0.690 | 0.739 | 0.456 | 0.630 | 0.713 |
| news_cif | P | 0.772 | 0.736 | 0.645 | 0.604 | 0.649 | 0.604 | 0.469 | 0.537 | 0.499 |
| stefan_cif | P | 0.853 | 0.838 | 0.781 | 0.830 | 0.822 | 0.770 | 0.790 | 0.791 | 0.747 |
| bicycle | I | 0.729 | 0.814 | 0.785 | 0.710 | 0.796 | 0.767 | 0.638 | 0.713 | 0.698 |
| cheer | I | 0.613 | 0.772 | 0.701 | 0.564 | 0.752 | 0.691 | 0.502 | 0.698 | 0.661 |
| flower | I | 0.717 | 0.730 | 0.636 | 0.721 | 0.720 | 0.630 | 0.707 | 0.695 | 0.608 |
| football | I | 0.750 | 0.738 | 0.626 | 0.741 | 0.703 | 0.622 | 0.719 | 0.682 | 0.608 |
| mobile | I | 0.598 | 0.683 | 0.625 | 0.622 | 0.668 | 0.611 | 0.592 | 0.635 | 0.591 |
| tennis | I | 0.299 | 0.516 | 0.478 | 0.458 | 0.523 | 0.477 | 0.460 | 0.508 | 0.470 |
| hp_dl | I | 0.595 | 0.737 | 0.511 | 0.504 | 0.705 | 0.495 | 0.428 | 0.635 | 0.457 |
| Average | | 0.684 | 0.733 | 0.672 | 0.656 | 0.710 | 0.658 | 0.602 | 0.663 | 0.626 |

Once the frame/field SAD are obtained, the structure of the current macroblock pair will be the field structure if $SAD_{FRM} - SAD_{FLD} \geq T_1$ and the frame structure if $SAD_{FLD} - SAD_{FRM} \geq T_2$. Otherwise the decision will be left to the second stage. In addition, the thresholds are set higher for P and B pictures than for I pictures because $\Delta COST$ and $\Delta SAD$ might be less correlated for macroblocks predicted in the inter prediction modes.

In the second stage, the encoding process first finds the optimal prediction modes for the current macroblock pair with the inferred structure. An early decision will be made to the inferred structure without searching for the optimal prediction modes with the non-inferred structure. This technique is based on the statistical evidence that the optimal prediction modes with the inferred structure are somewhat correlated to the amount of COST reduced by testing the non-inferred structure also and selecting the better structure.

Table 4 shows macroblock prediction mode statistics obtained by encoding "bicycle," a well-used interlaced video sequence, using the first stage described above.

TABLE 4

| Macroblock Prediction Mode | Occurrence | | COST Reduced | | Efficiency |
|---|---|---|---|---|---|
| I_PCM, Inter_16x16 | 1 | 0.0% | 4246 | 0.0% | 18.45 |
| I_PCM, Intra_16x16 | 1 | 0.0% | 3022 | 0.0% | 13.13 |
| B_Direct, Intra_4x4 | 481 | 1.1% | 222,749 | 2.2% | 2.01 |
| Inter_16x16, Intra_4x4 | 2743 | 6.2% | 1,176,805 | 11.5% | 1.86 |
| Inter_16x16, Intra_16x16 | 914 | 2.1% | 354,231 | 3.5% | 1.68 |
| Inter_8x8, Intra_4x4 | 1003 | 2.3% | 378,728 | 3.7% | 1.64 |
| Inter_16x8, Intra_4x4 | 806 | 1.8% | 301,888 | 2.9% | 1.63 |
| Intra_16x16, Intra_16x16 | 836 | 1.9% | 296,535 | 2.9% | 1.54 |
| Intra_16x16, Intra_4x4 | 1910 | 4.3% | 670,832 | 6.5% | 1.53 |
| Inter_16x8, Inter_16x8 | 970 | 2.2% | 263,162 | 2.6% | 1.18 |
| Inter_16x8, Intra_16x16 | 154 | 0.3% | 41,147 | 0.4% | 1.16 |
| B_Direct, Inter_8x8 | 1732 | 3.9% | 427,066 | 4.2% | 1.07 |
| B_Direct, Inter_16x8 | 1632 | 3.7% | 389,329 | 3.8% | 1.04 |
| Inter_8x8, Intra_16x16 | 124 | 0.3% | 29,177 | 0.3% | 1.02 |
| Inter_16x16, Inter_8x8 | 2854 | 6.4% | 661,594 | 6.5% | 1.01 |
| Inter_16x8, Inter_8x8 | 1635 | 3.7% | 369,012 | 3.6% | 0.98 |
| B_Direct, Intra_16x16 | 128 | 0.3% | 27,364 | 0.3% | 0.93 |
| Inter_16x16, Inter_16x8 | 4168 | 9.4% | 865,419 | 8.4% | 0.90 |
| Intra_4x4, Intra_4x4 | 3461 | 7.8% | 690,137 | 6.7% | 0.87 |
| Inter_8x8, Inter_8x8 | 1757 | 3.9% | 319,284 | 3.1% | 0.79 |
| B_Direct, Inter_16x16 | 4572 | 10.3% | 768,391 | 7.5% | 0.73 |
| Inter_16x16, Inter_16x16 | 8130 | 18.3% | 1,363,071 | 13.3% | 0.73 |
| B_Direct, B_Direct | 3909 | 8.8% | 616,109 | 6.0% | 0.68 |
| B/P Skip, Inter_8x8 | 12 | 0.0% | 820 | 0.0% | 0.30 |
| B/P Skip, Inter_16x8 | 27 | 0.1% | 966 | 0.0% | 0.16 |
| B/P Skip, Inter_16x16 | 256 | 0.6% | 7306 | 0.1% | 0.12 |
| B/P Skip, B_Direct | 212 | 0.5% | 3753 | 0.0% | 0.08 |

TABLE 4-continued

| Macroblock Prediction Mode | Occurrence | | COST Reduced | | Efficiency |
|---|---|---|---|---|---|
| B/P Skip, B/P_Skip | 94 | 0.2% | 832 | 0.0% | 0.04 |
| B/P Skip, Intra_16x16 | 2 | 0.0% | 0 | 0.0% | 0.00 |
| I_PCM, Intra_4x4 | 1 | 0.0% | 0 | 0.0% | 0.00 |

For macroblock pairs whose structure was not determined in the first stage, the optimal prediction modes were sought for both the inferred and the non-inferred structures. The left most two columns show the optimal prediction modes of the top and the bottom macroblocks with the inferred structure and its occurrence. Note that Inter_8×16 prediction mode is merged into Inter_16×8. The top and the bottom prediction modes are lexicographically ordered, then the left (right) one in the braces does not necessarily represent the top (bottom) macroblock prediction mode. The COST reduced column shows the total amount of COST reduced by selecting the better structure between the inferred and the non-inferred structures, compared to always selecting the inferred structure for the optimal prediction mode pair. Note that the COST reduction is achieved only when the non-inferred structure gives better (i.e. lower) COST. The efficiency column lists:

$$COST_{reduced}(\%) / occurrence(\%) \qquad (20)$$

Suppose that an encoding process tests the non-inferred structure only for macroblock pairs that have certain optimal prediction modes obtained with the inferred structure. Then the higher efficiency of an optimal prediction mode pair means more COST reduction with less computational complexity. For example, tabulations show that restricting the further search with the non-inferred structure to the prediction mode pair (Intra_16×16, Intra_4×4) only, it is expected that the COST will be decreased by 11.5% at the expense of 6.2% increase of the number of searches with the non-inferred structure. By restricting the set of prediction modes for further search with the non-inferred structure, the tradeoff between computational complexity and the COST can be controlled.

Extensive analysis of experimental results employing the methodology of the invention has demonstrated striking results. An important parameter of interest is the number of calls of the function that finds the optimal prediction mode for a macroblock with either frame/field structure. The number of calls of the search function can be considered as an approximate measure of the computational complexity and the present invention is intended to reduce the number with the early structure decision techniques as described above.

For interlaced sequences, the number of calls of the search function was reduced by 44.2% while the signal-to-noise ratio (SNR) was degraded by 0.22 dB on average. For progressive sequences the number of calls of the search function was reduced by 41.4% while the SNR was even improved by 0.03 dB on average. For progressive sequences, the COST discrepancy might mostly be negative (i.e. $COST_{FRM} < COST_{FLD}$) or nearly equal to zero. The result shows that the exhaustive method does not give globally optimum selection because it naively follows the subtle COST discrepancy. The present invention enables MBAFF with increase of the number of calls of the search function by 11.6% for the interlaced sequences and by 17.2% for the progressive sequences on average. In contrast the prior art exhaustive method requires an increase of 100%. The SNR was slightly degraded for the interlaced sequences, but even improved for the progressive sequences. Therefore the present method outperforms the prior art exhaustive method.

What is claimed is:

1. A method of video encoding selecting between encoding in a progressive frame mode structure and an interlaced field mode structure comprising the steps of:
    calculating a sum of absolute difference between respective upper and lower macroblocks and an average pixel value of the macroblocks in a frame mode;
    calculating a sum of absolute difference between respective upper and lower macroblocks and an average pixel value of the macroblocks in a field mode;
    determining if a difference between the sum of absolute difference in a frame mode structure and the sum of absolute difference in a field mode structure is greater than a first predetermined constant;
    selecting field mode structure for encoding the macroblock if the difference between the sum of absolute difference in the frame mode structure and the sum of absolute difference in the field mode structure is greater than the first predetermined constant;
    determining if a difference between the sum of absolute difference in the field mode structure and the sum of absolute difference in the frame mode structure is greater than a second predetermined constant;
    selecting frame mode structure for encoding the macroblock if the difference between the sum of absolute difference in the field mode structure and the sum of absolute difference in the frame mode structure is greater than the second predetermined constant; and
    encoding the macroblock using the field mode structure if the field mode structure is selected and using the frame mode structure if the frame mode structure is selected.

2. A method of video encoding selecting between encoding in a progressive frame mode structure and an interlaced field mode structure comprising the steps of:
    calculating a sum of absolute difference between respective upper and lower macroblocks and an average pixel value of the macroblocks in the frame mode including
    calculating a mean value for respective upper and lower macroblocks as follows:

$$\mu_{i,FRM,U} = \frac{1}{W \cdot H} \sum_{y=0}^{H-1} \sum_{x=0}^{W-1} f_i(x, y),$$

$$\mu_{i,FRM,L} = \frac{1}{W \cdot H} \sum_{y=0}^{H-1} \sum_{x=0}^{W-1} f_i(x, y + H);$$

where: $\mu_{i,FRM,U}$ is the mean value for the i-th sub-block for the frame structure mode for the upper macroblock; $\mu_{i,FRM,L}$ is the mean value for the i-th sub-block for the frame structure mode for the lower macroblock; W is the macroblock width; H is the macroblock height; and $f_i(x, y)$ denotes sample value at position (x,y) in the i-th sub-block;

calculating the sum of absolute difference for the i-th sub-block frame structure as follows:

$$sad_{i,FRM} = \sum_{y=0}^{H-1} \sum_{x=0}^{W-1} (|f_i(x, y) - \mu_{i,FRM,U}| + |f_i(x, y + H) - \mu_{i,FRM,L}|); \text{ and}$$

calculating the sum of absolute difference for all sub-blocks as follows:

$$sad_{FRM} = \sum_{i=0}^{L^2/(WH)-1} sad_{i,FRM};$$

calculating a sum of absolute difference between respective upper and lower macroblocks and an average pixel value of the macroblocks in a field mode;
determining if a difference between the sum of absolute difference in a frame mode structure and the sum of absolute difference in a field mode structure is greater than a first predetermined constant;
selecting field mode structure for encoding the macroblock if the difference between the sum of absolute difference in the frame mode structure and the sum of absolute difference in the field mode structure is greater than the first predetermined constant;
determining if a difference between the sum of absolute difference in the field mode structure and the sum of absolute difference in the frame mode structure is greater than a second predetermined constant;
selecting frame mode structure for encoding the macroblock if the difference between the sum of absolute difference in the field mode structure and the sum of absolute difference in the frame mode structure is greater than the second predetermined constant; and
encoding the macroblock using the field mode structure if the field mode structure is selected and using the frame mode structure if the frame mode structure is selected.

3. The method of claim 2, wherein:
the video is received in a YUV 4:2:0 format; and
said step of calculating a sum of absolute difference between respective upper and lower macroblocks and an average pixel value of the macroblocks in the frame mode includes
separately calculating a sum of absolute difference for each color component YUV, and
summing the calculated sum of absolute difference for each color component YUV as follows:

$$SAD_{FRM} = sad_{FRM}(Y) + 4[sad_{FRM}(Cb) + sad_{FRM}(Cr)]$$

where: Cb corresponds to the U chrominance component; and Cr corresponds to V chrominance component.

4. A method of video encoding selecting between encoding in a progressive frame mode structure and an interlaced field mode structure comprising the steps of:

calculating a sum of absolute difference between respective upper and lower macroblocks and an average pixel value of the macroblocks in a frame mode;

calculating a sum of absolute difference between respective upper and lower macroblocks and an average pixel value of the macroblocks in the field mode including calculating a mean value for respective upper and lower macroblocks as follows:

$$\mu_{i,FLD,U} = \frac{1}{W \cdot H} \sum_{y=0}^{H-1} \sum_{x=0}^{W-1} f_i(x, 2y),$$

$$\mu_{i,FLD,L} = \frac{1}{W \cdot H} \sum_{y=0}^{H-1} \sum_{x=0}^{W-1} f_i(x, 2y+1);$$

where: $\mu_{i,FLD,U}$ is the calculated mean value for the i-th sub-block for the field structure mode for the upper macroblock; $\mu_{i,FLD,L}$ is the calculated mean value for the i-th sub-block for the field structure mode for the lower macroblock; W is the macroblock width; H is the macroblock height; and $f_i(x,y)$ denotes sample value at position (x,y) in the i-th sub-block;

calculating the sum of absolute difference for the i-th sub-block field structure as follows:

$$sad_{i,FLD} = \sum_{y=0}^{H-1} \sum_{x=0}^{W-1} (|f_i(x, 2y) - \mu_{i,FLD,U}| + |f_i(x, 2y+1) - \mu_{i,FLD,L}|); \text{ and}$$

calculating the sum of absolute difference for all sub-blocks as follows:

$$sad_{FLD} = \sum_{i=0}^{L^2/(WH)-1} sad_{i,FLD};$$

determining if a difference between the sum of absolute difference in a frame mode structure and the sum of absolute difference in a field mode structure is greater than a first predetermined constant; selecting field mode structure for encoding the macroblock if the difference between the sum of absolute difference in the frame mode structure and the sum of absolute difference in the field mode structure is greater than the first predetermined constant;

determining if a difference between the sum of absolute difference in the field mode structure and the sum of absolute difference in the frame mode structure is greater than a second predetermined constant;

selecting frame mode structure for encoding the macroblock if the difference between the sum of absolute difference in the field mode structure and the sum of absolute difference in the frame mode structure is greater than the second predetermined constant; and encoding the macroblock using the field mode structure if the field mode structure is selected and using the frame mode structure if the frame mode structure is selected.

5. The method of claim 4, wherein:

the video is received in a YUV 4:2:0 format; and said step of calculating a sum of absolute difference between respective upper and lower macroblocks and an average pixel value of the macroblocks in the frame mode includes separately calculating a sum of absolute difference for each color component YUV, and summing the calculated sum of absolute difference for each color component YUV as follows:

$$SAD_{FLD} = sad_{FLD}(Y) + 4[sad_{FLD}(Cb) + sad_{FLD}(Cr)]$$

where: Cb corresponds to the U chrominance component; and Cr corresponds to V chrominance component.

6. The method of claim 1, further comprising:

if neither the difference between the sum of absolute difference in a frame mode structure and the sum of absolute difference in a field mode structure is greater than the first predetermined constant nor the difference between the sum of absolute difference in the field mode structure and the sum of absolute difference in the frame mode structure is greater than the second predetermined constant, then inferring one of the frame structure or the field structure from previously encoded neighboring macroblocks, determining an optimal prediction mode with the inferred structure, determining if the optimal prediction mode is within a set of empirically derived prediction modes, if said optimal prediction mode is not within the set of empirically derived prediction modes, then encoding the macroblock, if said optimal prediction mode is within the set of empirically derived prediction modes, then determining an optimal prediction mode with the non-inferred structure, selecting the optimal prediction mode with the inferred structure or the optimal prediction mode with the non-inferred structure based upon a cost measure, and encoding the macroblock with the selected optimal prediction mode structure.

* * * * *